Patented Mar. 18, 1930

1,751,213

UNITED STATES PATENT OFFICE

LEON McCULLOCH, OF PITTSBURGH, PENNSYLVANIA, ASSIGNOR TO WESTINGHOUSE ELECTRIC & MANUFACTURING COMPANY, A CORPORATION OF PENNSYLVANIA

INSULATING COATING ON ALUMINUM OR ALUMINUM ALLOYS

No Drawing. Application filed November 19, 1927. Serial No. 234,560.

My invention relates to insulating material, and more particularly to a new composition of matter and to a process for coating aluminum and aluminum alloys with an insulating film.

An object of my invention is to provide a new composition of matter comprising water, lime and plaster of Paris or gypsum, which is especially adaptable as a composition for producing films upon aluminum or aluminum alloys.

Another object of my invention is to provide an improved insulation medium that is pliable and adhesive and which finds various uses in the electrical arts, but which is especially effective as an insulation medium for condensers and between the turns of coils or windings of electrical generators, electromagnets and other electrical apparatus.

Another object of my invention is to provide an economical process for producing an improved coating film upon metals that is simpler than the electrolytic method and produces a film that resists corrosion, is water-proof and fire-proof, has especially good insulation properties and provides a surface upon which indicating symbols may be written or printed.

It has heretofore been the practice to coat metals, especially aluminum, with an oxide film, either by oxidation or by electrolysis, and to utilize the material thus obtained as a medium to insulate the field coils of generators from each other either by wrapping the oxide-coated metal around the conductors or placing it between the respective coils.

I have discovered that films may be coated upon metals such as aluminum or aluminum alloys, by a much simpler process than by oxidation or electrolysis and that a film may be produced that is equally as effective as, or superior to the films produced by such methods and since the mixture of compounds that I prefer to use is only slightly soluble in water, the concentration of the solution remains practically constant, thus enabling the process to be easily controlled.

The films produced by my novel method are non-reflective, smooth and more uniform than films produced by previous methods, and are generally whiter in appearance, but their color is dependent to a considerable extent upon whether aluminum or an aluminum alloy is coated.

In practicing my invention, I provide a bath composed of water, lime and calcium sulphate. The lime and calcium sulphate are added to the water and as they are only slightly soluble, the resulting mixture will consist partly of a suspension and partly of a solution of the lime and calcium sulphate in water. The lime and calcium sulphate may be added to the water in various proportions, providing there is sufficient water to permit the reaction to take place, and I, therefore, do not wish to be limited in this respect.

A satisfactory composition consists of about 5 grams each of lime and calcium sulphate dissolved or suspended in one liter of water. Although anhydrous calcium sulphate or plaster of Paris may be used, I prefer to use gypsum, as by using calcium sulphate hydrated with two molecules of water, caking of the material at the bottom of the vessel is avoided. The aqueous mixture is heated, preferably from about 90° C. to the boiling point, and the metal to be coated is suspended therein for a period of a few minutes to an hour, depending upon the thickness of the film desired. I have found, however, that if the metal is kept in the bath for a period of from 5 to 30 minutes, a smooth, coherent film of the desired thickness will generally be obtained.

When the metal is first placed in the aqueous solution and suspension of lime and gypsum, a vigorous reaction takes place, with the evolution of hydrogen. After a few minutes, the reaction proceeds slowly and a firm, coherent film is deposited upon the metal. In practicing my invention, it has been found that sediment collects at the bottom of the vessel, which sediment should be removed each day and the bath replenished by adding fresh material in the proportions specified. The function of the calcium sulphate is not now known. It may decrease the alkalinity of the solution and in this manner cause the film to be smooth and more uniform.

After the coated metal has been removed from the suspension, it is rinsed in water and baked in an oven at a temperature of about 200° C. The baking expels the water and increases the resistance of the film. Before baking, the film resistance is about 0.1 megohm per square inch, while after baking this resistance is increased to from 10 to 20 megohms per square inch.

Metals coated with a film in the manner specified are capable of withstanding an electromotive force of about 220 volts applied directly to their surface. The film, however, is porous in structure and permits a slight electrical leakage caused by the moisture in the air. This defect may be remedied by coating the film with an insulating oil, such as China wood or linseed oil, or with an ordinary insulating varnish, such as a solution of a synthetic or natural resin or gum in a vegetable drying oil. Asphaltic gum dissolved in any suitable solvent such as benzene or toluene is especially suitable for this purpose.

While metals coated with a film produced by my novel method have been described as being particularly useful for insulating purposes, it will be understood that their application is not limited in this respect. For example, indicating needles or pointers may be given a white finish by suspending them for a few minutes in my improved composition. Metals coated in the manner described are especially suitable for dials as they are more permanent than cardboard, and symbols may be written or printed upon the film-coated metal. When used for this purpose, it is sometimes desirable to coat the film with collodion, which prevents the ink from spreading and keeps the film from being easily soiled, or, if preferred, the film may be first impregnated with insulation varnish and then coated with collodion. Aluminum or aluminum alloys containing a major proportion of aluminum coated in the manner specified are also useful in aeroplane structure, as they are fire-proof and water-proof and resist corrosion.

A chemical analysis of the film produced in the manner specified discloses that it is composed of the following ingredients in approximately the proportions indicated:

|  | Per cent |
| --- | --- |
| Aluminum oxide | 76.8 |
| Calcium oxide | 8.1 |
| Sulphur trioxide | 15.1 |
|  | 100 |

This analysis indicates that the film produced when lime and gypsum is used is composed of aluminum oxide and calcium sulphate.

The composition for producing the film is subject to various modifications. Strontium oxide may be substituted for all or a part of the lime, but calcium oxide is preferred as it permits the thickness of the film to be more easily controlled. In general, the selected alkaline earth metal will have an atomic weight between 40 and 90.

Barium oxide and other alkaline solutions are not satisfactory, as they corrode the metal and films are not formed. Other calcium or alkaline earth metal salts may be substituted for calcium sulphate, such as calcium nitrate, calcium chloride, or the corresponding strontium salts or a mixture of one or more of these salts may be used, but the use of calcium sulphate is preferable as it is only slightly soluble in water and produces a smoother film.

It will be understood that in adapting my process to commercial use, the metallic member to be coated, instead of being suspended in the aqueous composition, may be slowly and continuously drawn through the bath in a manner well-known in the art.

The method which I have described is particularly adapted for coating thin sheets, metal foil having a thickness of 0.25 of a mil being successfully coated by my improved process. This makes my method particularly adapted for producing insulation material. Foil of the thickness specified, when coated by electrolytic methods, becomes brittle and its efficiency as an insulation material is greatly diminished.

While I have described a specific embodiment of my invention, it will be understood that various changes may be made therein without departing from the spirit and scope of my invention, as defined in the appended claims.

I claim as my invention:

1. A composition of matter for producing films upon aluminum or aluminum alloys, comprising water, an oxide of an alkaline earth metal having an atomic weight between 40 and 90, and an alkaline earth metal salt.

2. A composition of matter for producing films upon aluminum or aluminum alloys, comprising water and an oxide of an alkaline earth metal having an atomic weight between 40 and 90 and an alkaline earth metal salt, the alkaline earth metal oxide and the alkaline earth metal salt being only slightly soluble in the water.

3. A composition of matter for producing films upon aluminum or aluminum alloys, comprising water, calcium oxide and calcium sulphate.

4. A composition of matter for producing films upon aluminum or aluminum alloys comprising water, lime and gypsum.

5. An insulating material comprising a base metal containing a major proportion of aluminum coated with a film, said film comprising aluminum oxide and an alkaline earth metal salt.

6. An insulating material comprising a base metal containing a major proportion of aluminum coated with a film comprising aluminum oxide and calcium sulphate.

7. An insulating material comprising an aluminum foundation metal coated with a film comprising aluminum oxide and calcium sulphate.

8. A base metal containing a major proportion of aluminum coated with a film comprising aluminum oxide and a calcium salt.

9. An aluminum foundation metal coated with a film containing aluminum oxide and a calcium salt.

10. A composition of matter for producing films upon aluminum or aluminum alloys comprising water, an oxide of an alkali earth metal having an atomic weight between 40 and 90 and an alkaline earth metal salt of an inorganic acid.

11. The process of coating aluminum or aluminum alloys containing a major proportion of aluminum which comprises immersing a body of the material in a bath containing water, an alkaline-earth-metal oxide that is only slightly soluble in water at room temperature and an alkaline-earth-metal salt for a sufficient length of time to cause the deposition of a film upon the body, withdrawing the film-coated body from the bath and then drying the deposited film.

12. The process of coating aluminum or aluminum alloys containing a major proportion of aluminum which comprises immersing a body of the material in a bath containing water, an alkaline-earth-metal oxide that is only slightly soluble in water at room temperature and gypsum for a sufficient length of time to cause the deposition of a film upon the body, withdrawing the film-coated body from the bath and then drying the deposited film.

13. The process of coating aluminum or aluminum alloys containing a major proportion of aluminum which comprises immersing a body of the material in a bath containing water, lime and gypsum for a sufficient length of time to cause the deposition of a film upon the body, withdrawing the body from the bath and drying the deposited film.

14. The process of coating aluminum or aluminum alloys containing a major proportion of aluminum which comprises immersing a body of the material in a bath containing a heated mixture of water, lime and gypsum for a sufficient length of time to cause the deposition of a film upon the body, withdrawing the film-coated body from the bath and drying the deposited film.

15. The process of coating aluminum or aluminum alloys containing a major proportion of aluminum which comprises immersing a body of the material in a bath containing water, an alkaline-earth-metal oxide that is only slightly soluble in water at room temperature and an alkaline-earth-metal salt for a sufficient length of time to cause the deposition of a film upon the body, withdrawing the film-coated body from the bath and then drying the film at an elevated temperature.

In testimony whereof, I have hereunto subscribed my name this 12th day of November, 1927.

LEON McCULLOCH.